No. 684,360. Patented Oct. 8, 1901.
C. EBERHART.
NUT LOCK.
(Application filed Mar. 28, 1901.)
(No Model.)
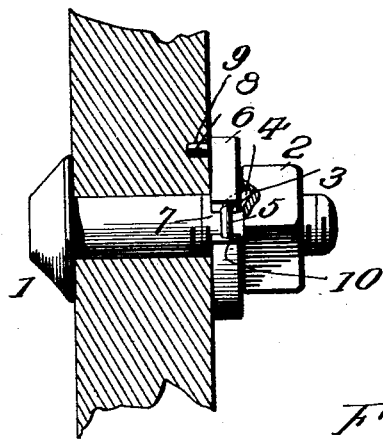
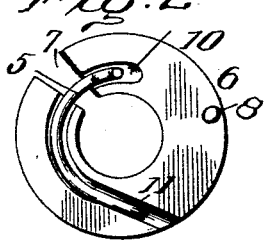
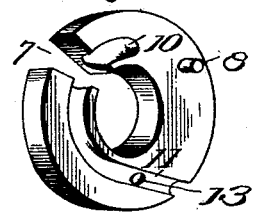
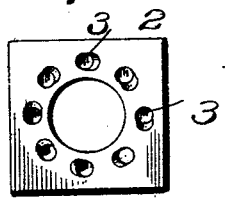
Witnesses
C. Eberhart, Inventor
his Attorneys

UNITED STATES PATENT OFFICE.

CHRISTIAN EBERHART, OF FOND DU LAC, WISCONSIN.

NUT-LOCK.

SPECIFICATION forming part of Letters Patent No. 684,360, dated October 8, 1901.

Application filed March 28, 1901. Serial No. 53,273. (No model.)

*To all whom it may concern:*

Be it known that I, CHRISTIAN EBERHART, a citizen of the United States, residing at Fond du Lac, in the county of Fond du Lac and State of Wisconsin, have invented certain new and useful Improvements in Nut-Locks; and I do hereby declare the following to be a full, clear, and exact description of the invention, such as will enable others skilled in the art to which it appertains to make and use the same.

This invention has relation to means for preventing the loosening of a nut, tap, or bur after the same has been screwed home upon a bolt or analogous fastening; and in its construction the nut-lock comprises a washer adapted to slip loosely upon the bolt and provided with means to interlock with the part through which the bolt passes, said washer having a cleft or space extending outwardly from the bolt-opening and having in its outer face a curved depression intersecting the said cleft and adapted to receive a locking-spring the free end of which is turned outward to engage with one of a series of notches or depressions formed in the inner face of the nut or tap.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1 is a detail view showing the application of the invention. Fig. 2 is a front view of the washer with the interlocking spring in position. Fig. 3 is a perspective view of the washer, the locking-spring being removed. Fig. 4 is a view of the rear side of the nut. Fig. 5 is a detail perspective view of the locking-spring.

Corresponding and like parts are referred to in the following description and indicated in all the views of the drawings by the same reference characters.

The bolt 1 and nut 2 are of ordinary construction, with the exception that a circular series of notches or depressions 3 are formed in the inner face or side of the nut concentric with the bolt-opening, said notches or depressions being beveled or inclined at one side to facilitate the riding of the nut upon the outturned end 4 of the locking-spring 5 when screwing the nut or bur home upon the bolt.

The washer 6 is adapted to move freely upon the threaded portion of the bolt 1 and is provided in one side with a cleft or space 7, extending outward from the bolt-opening, and is formed with a rear extension 8 to enter an opening in the part 9, against which the washer is clamped by the nut or bur 2, so as to prevent rotation thereof. A curved seat or channel 10 is formed in the outer face of the washer 6 to receive the locking-spring 5, and this channel intersects with the cleft or space 7 and is deepest at this point and gradually diminishes in depth toward the opposite end, which is formed on a tangent, as shown at 11, and is of a depth to admit of the attaching end of the locking-spring being clamped in the part 11 of the seat by means of the nut 2. By having the cleft or space 7 located adjacent to the outturned end 4 of the locking-spring an instrument may be inserted between the inner face of the nut 2 and the locking-spring, so as to release the nut and admit of its removal, the releasing being effected by withdrawing the outturned end from the notch or depression 3, in which it is fitted when the nut is turned up tight against the outer face of the washer.

The locking-spring 5 conforms to the outline of the channel or curved seat 10 and consists of a length of spring-wire of suitable gage, one end being bent outward, as shown at 4, to interlock with the notches or depressions 3 and the opposite end being bent at a right angle, as shown at 12, to pass through an opening 13 in the washer, whereby the said spring is held in place when the washer is removed from the bolt.

Having thus described the invention, what is claimed as new is—

1. In a nut-lock, a washer having a cleft or space extending outward from the bolt-opening and provided in its outer face with a curved seat or channel having an end portion intersecting said cleft and having the opposite end portion of gradually-decreasing depth and terminating in a tangential portion, a locking-spring fitted in the said curved channel and having one end outturned and having its opposite end bent and fitted into an opening in the washer extending from the tangential portion of the curved seat or channel, the outturned end of the locking-spring being adapted to engage with one of a series of notches or depressions formed in the inner face of the nut concentric with the opening thereof, substantially as set forth.

2. In a nut-lock, and in combination with the bolt and a nut having a circular series of notches or depressions formed in its inner face, a washer having a rear extension and having a cleft or space extending outward from the bolt-opening and provided in its outer face with a curved seat or channel intersecting the said cleft at one end and having the opposite end portion gradually decreasing in depth and formed on a tangent, and a curved locking-spring located in the said channel and having an end portion outturned and its opposite end portion bent about at a right angle and fitted into an opening formed in the said washer, the outer portion of the spring coming flush with the outer side of the washer so as to be clamped in the seat by means of the nut, substantially as set forth.

In testimony whereof I affix my signature in presence of two witnesses.

CHRISTIAN EBERHART. [L. S.]

Witnesses:
W. D. CORNELL,
F. R. TABOR.